No. 839,895. PATENTED JAN. 1, 1907.
H. SIEGWART.
PROCESS AND APPARATUS FOR MANUFACTURING HOLLOW MASTS, PIPES, HOLLOW PILES, &c.
APPLICATION FILED JULY 12, 1906.
3 SHEETS—SHEET 1.

Witnesses:
O. V. Sommers
R. W. Helff

Inventor:
Hans Siegwart,
by
Henry Orth Jr.
Att.

No. 839,895.  PATENTED JAN. 1, 1907.
H. SIEGWART.
PROCESS AND APPARATUS FOR MANUFACTURING HOLLOW MASTS, PIPES, HOLLOW PILES, &c.
APPLICATION FILED JULY 12, 1906.

3 SHEETS—SHEET 3.

Witnesses:
O. P. Dommers
R. W. Helff

Inventor:
Hans Siegwart,
by Henry Orth Jr.
Atty.

007# UNITED STATES PATENT OFFICE.

HANS SIEGWART, OF LUCERNE, SWITZERLAND.

PROCESS AND APPARATUS FOR MANUFACTURING HOLLOW MASTS, PIPES, HOLLOW PILES, &c.

No. 839,895.     Specification of Letters Patent.     Patented Jan. 1, 1907.

Application filed July 12, 1906. Serial No. 325,889.

*To all whom it may concern:*

Be it known that I, HANS SIEGWART, a citizen of the Republic of Switzerland, residing at Lucerne, Switzerland, have invented certain new and useful Improvements in Processes and Apparatus for Manufacturing Hollow Masts, Pipes, Hollow Piles, and other Like Structures; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a method and apparatus for manufacturing hollow masts, pipes, hollow piles, and other like structures from concrete or iron concrete. The manufacture is characterized by the concrete mass with the stiffening parts being helically wound under strong pressure in strips round a core intended to form the hollow space, and which is subsequently removed, a band or conveyer being provided for that purpose, which is partly wound in a helical line about the core, and on which band the concrete mass to be wound is deposited. This endless band transports the concrete mass to the core, the band portion, guided in a helical line round the core, winding and applying the concrete mass on the core with pressure.

The accompanying drawings illustrate, by way of example, a machine for manufacturing masts for carrying out the process according to this invention.

Figure 1:
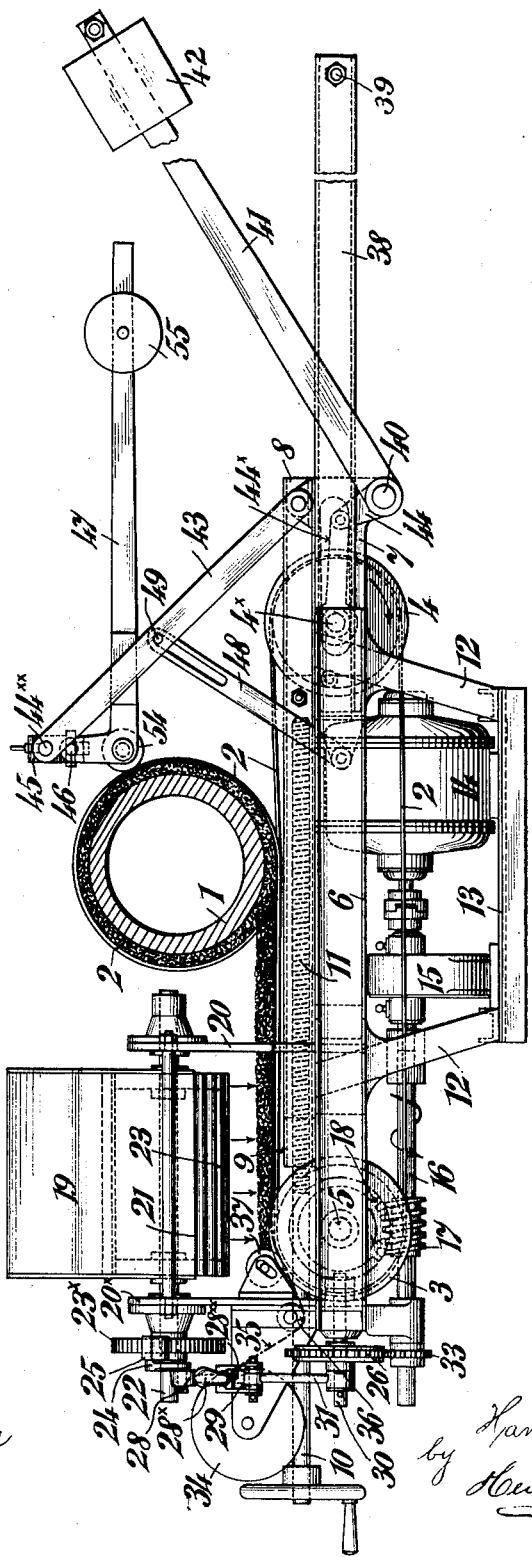
Figure 2:
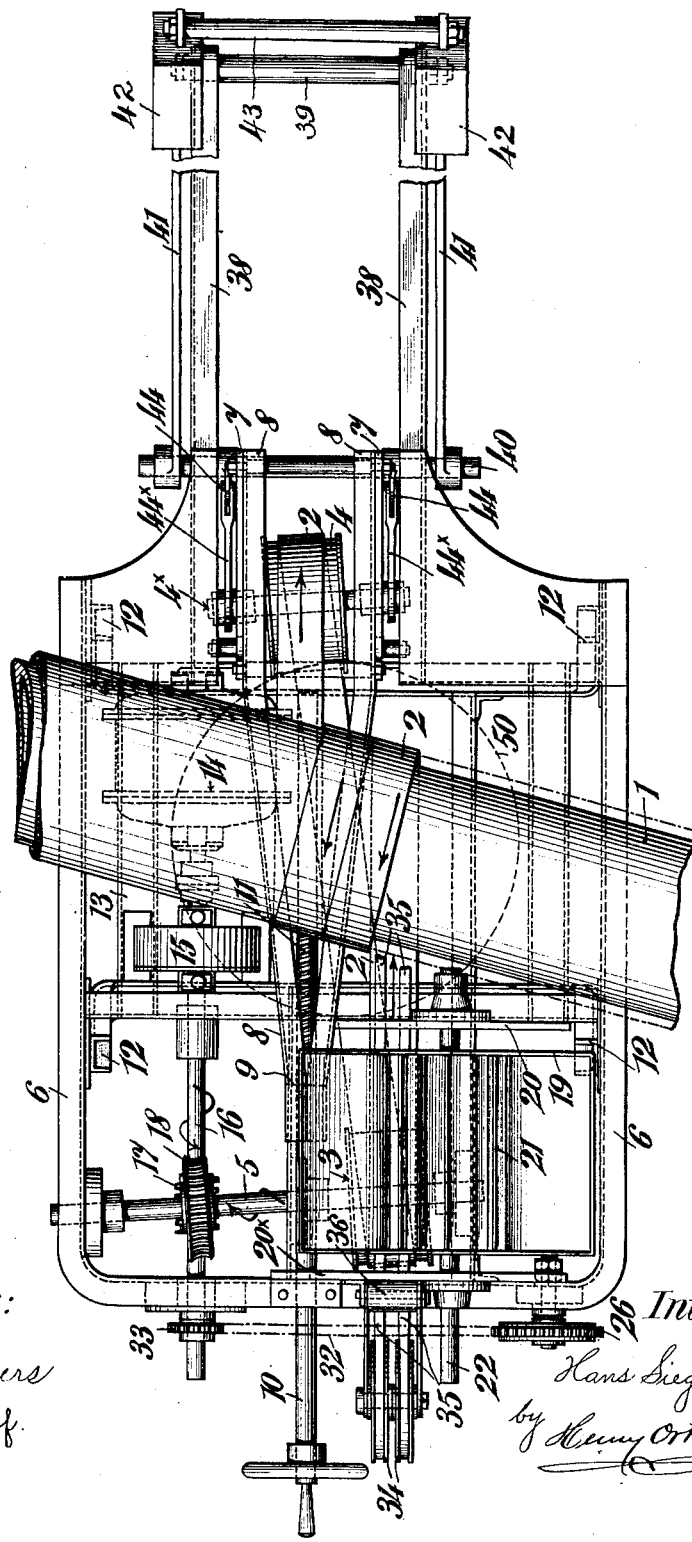

Figure 1 shows the machine in partial side elevation. Fig. 2 is a partial plan, and Fig. 3 a partial front elevation. Fig. 4 shows diagrammatically, on a smaller scale, in plan, the machine with a driving-frame and the core serving for producing the hollow space.

The core 1, extending from left to right obliquely relatively to the person looking at the drawings, has the shape of a rod of circular cross-section and serves for manufacture of a mast. About the said core is wound in two adjacent helically-wound strips a portion of an endless band 2, which is passed round the core twice and stretched between two rollers 3 and 4. The roller 3, arranged on the left-hand side of the core 1, is secured to a horizontal spindle 5, mounted in a frame 6, arranged approximately transversely of the core 1. The roller 4 is supported by means of a spindle 4* in slotted plates 7, arranged on a frame 8, arranged longitudinally of the frame 6 and above the said frame 6. The frame 8 is adjustable relatively to the frame 6, and its left-hand end is provided with a nut or socket 9, through which passes a horizontal spindle 10, rotatable, but not longitudinally movable, in the frame 6. The said spindle is provided with a screw-thread 11 and extends parallel to the longitudinal direction of the frame 6. The frame 6 is supported on brackets 12, carried by a bottom plate 13. On the bottom plate is mounted an electric of other motor 14, intended to drive the spindle 5 by means of a gear 15, a spindle 16, and worm-wheels 17 18.

Above the pulley 3 is arranged a charging device provided with a hopper 19, arranged between two plates 20 20*, by which it is supported. (In Fig. 3 half of the charging device is shown in section.) Of the said supporting-plates arranged transversely of the frame 6 the plate 20* is supported by the frame 6 direct and the plate 20 by means of a transverse bar. The bottom opening of the hopper 19, which has an oblong rectangular form and the longitudinal axis of which is parallel to the longitudinal direction of the frame, is closed by a roller 21, supported in the plates 20 and 20*, the spindle 22 of the said roller being also parallel to the longitudinal direction of the frame 6. This roller is provided on the circumference with radial ribs 23, extending in the longitudinal direction of the roller. To the left-hand end portion of the spindle 22 is secured a ratchet-wheel 23*, with which engages a pawl 25, mounted on an arm 24, pivoted about the spindle 22, Figs. 1 and 3. The arm 24 is operated by a chain-wheel 26, mounted on the frame 6, by means of a pivoted rod 28, engaging at one end with the arm 24 and at the other end with a link 29, pivoted about 20*, and of a pivoted rod 31 engaging, on the one hand, with the link 29 and, on the other hand, with a stud 30, arranged eccentrically of the pivot-pin of the wheel 26, the said chain-wheel 26 receiving its rotation by means of a chain 32 from a chain-wheel 33, secured to the shaft 16. Outside on the supporting-plate 20* are mounted, by means of brackets, two pulleys 34, from which metal bands 35 are guided under a guide-roll 36, mounted on 20*, Figs. 1 and 2, over the portion of the band 2 passing over the pulley 3, so as to extend in the longitudinal direction of the said band. A press-roller 37, mounted on 20*, is intended to be pressed by suitable means (not shown in the drawings) against the band 2.

To the right-hand end of the frame 6 are secured two parallel horizontal U-bars 38, (extending in the longitudinal direction of the frame 6,) the outer ends of which U-bars are connected together by a stay 39. Under the said bars a horizontal spindle 40 is supported transversely of the same in the slotted plates 7, the said spindle carrying on its end portions projecting outside the bars lever-arms 41, which extend in the same direction and are of the same length and each of which carries at its free end a weight 42, the two arms being connected together by a stay 43. Between the bars are secured to the spindle 40 short lever-arms 44, the free ends of which are connected by pivoted rods 44* to the ends of the spindle 4*. In this way, owing to the action of the weights 42, the endless band 2 is kept taut and stretched.

Figure 3:
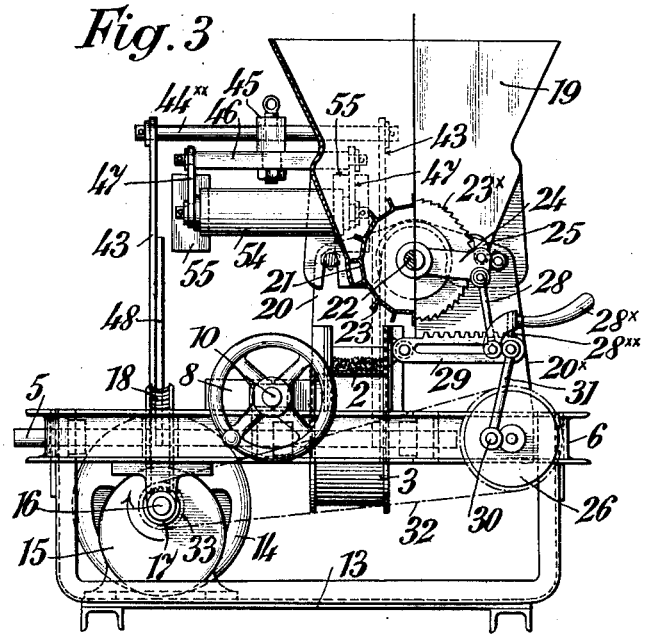
Figure 4:
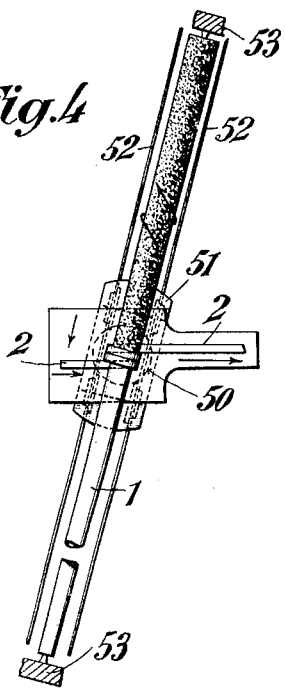

At the right-hand end of the frame 8 are arranged two oblique upwardly-extending arms 43, inclined toward the core 1, Figs. 1 and 3, which arms are of the same length and have their free ends connected together by means of a rod 44, rotatable in the said ends. In the center of the length of the said rod is secured a body 45, on which a horizontal roll 54 is mounted by means of a rod 46 and two angle-levers 47, provided with weights 55 at their outer ends, in such manner that it can swing out horizontally and swing about the axis of rotation of the rod 44. This roll comes then to rest against the band guided round the core and is pressed against it by the weights 55. Guide-arms or stays 48 are rotatably mounted on the frame 6, and the levers 43 can be secured in the slots of said arms at any level and fixed by means of screw-bolts 49.

The base 13 rests on a rotating frame 50, which is shown in Figs. 2 and 4, by a dotted line. This rotating frame is supported by a carriage 51, Fig. 4, which runs on parallel rails 52, between which the core 1 is arranged in the central longitudinal direction and so that it can rotate between fixed points 53.

Before proceeding to describe the working of the machine it must be pointed out that Fig. 2 shows the correct position of the axes of the pulleys 3 and 4 and of the core, while in Figs. 1 and 3 the said axes and the core have been assumed to be at right angles to the longitudinal axis of the frame 6 in order to facilitate drawing.

The working of the apparatus is as follows: After having filled the hopper 19 with concrete the motor 14 is started. When its spindle 16 rotates in the direction of the arrows in the drawings, it drives the spindle 5 in the direction indicated, whereby the portion of the band 2 situated above the pulley 3 is moved toward the core 1. At the same time the spindle 16 rotates the chain-wheel 26, which by means of the parts 31, 29, 28, 24, and 25 advances the ratchet-wheel 23*, so that the drum 21 is intermittently rotated, and owing to the arrangement of the ribs 23 a quantity of concrete corresponding to the movement of the wheel 23* is discharged on the portion of the band coming from the upper surface of the pulley 3. This concrete, which is uniformly distributed over the whole width of the band by means of a suitable device, not shown in the drawings, in Fig. 3 only the band 2 is indicated, and the concrete mass uniformly distributed on the band is shown dotted,) is conveyed by the band toward the core and carried round it in the shape of a helical strip and at the same time is pressed against the core, owing to the band being stretched by the weights 42, so that the strips come to lie next to one another and form a closed or continuous casing or layer round the core. At the same time for stiffening the said layer or coat the metal bands 35 from the pulleys 34 are wound round the core, together with the concrete carried round the core. Owing to the movement of the band, which is guided below from the pulley 4 back to the roller 3, the core is rotated in the direction of the arrows shown in Fig. 4, the whole machine being at the same time caused to move in the direction of the arrows. The machine moves, therefore, automatically forward as the operation is proceeding. The roll 54 is intended to relieve the portion of the band between the roll and the press-roller 37 from the pressure produced by the weights 42, so that the said band portion will sag, the object of which is to enable the concrete to be introduced between the core and the band without first pressing it on the core, as would be necessary if the said band portion were quite taut, and at the same time the roll 54 increases the density of the concrete by pressing the roll against the concrete winding. After the whole core has been coated in the manner described with a layer of concrete a stiffening device consisting of rods extending in the longitudinal direction of the mast and connected together is preferably placed on the said layer, and then another layer of concrete is put on in the manner described. The second layer can be without stiffening device. Then instead of the pulleys 34 a single roller could be provided, and a strip of fabric of the same width as the band 2 could be wound from the said single roller, together with the concrete, so that the said strip of fabric comes to lie outside. The object of the said strip of fabric is to prevent the concrete from adhering to the band 2, and it is subsequently removed again from the mast.

In manufacturing conical or taper masts the action of the weights 42 regulates the length of the band portion guided round the core to suit the taper of the core, and the band is at the same time stretched, the rotating disk enabling the machine to be adjusted to the position required by the taper of the mast to be manufactured. During the said regulation the weights 42 sink and must be raised again. To that purpose there is provided opposite the frame 6 a movable frame 7, which for the purpose of raising the weight is moved by means of the spindle 10 from left to right, whereby the weights are raised by means of the intermediate parts 44, 44*, 40, and 41.

The thickness of the strip of concrete applied by means of the band 2 depends on the quantity of the concrete discharged by the hopper 19 onto the band. In order to enable this quantity to be regulated, the point of attachment of the pivot-rod 28 to the link 29 is adjustable. To that end the said point can be brought nearer to or moved away from the pivot-point of the link, teeth being provided on the link 29 for the purpose of fixing the rod 28 relatively to the link 29, and then a hand-lever 28*, which is connected to the rod 28, can engage with the said teeth by means of a tooth 28** for the purpose of fixing the parts in position.

When the last-named point of attachment is brought nearer to the pivot-point of the line 29, the intermittent rotation of the ratchet-wheel 23* becomes smaller, and therefore the periodical discharge of concrete from the hopper is also reduced.

Instead of moving the apparatus along the core by means of the band 2 it can be provided with a driving mechanism independent of the band 2, or it can always remain in the same position, the core then having to be moved instead of the machine. The band instead of being in one piece, as illustrated, can also be made of several suitably-connected parts—for instance, of several adjacent longitudinal parts or strips.

The core 1 is preferably hollow and of such construction that its circumference can be reduced by drawing together the walls of the core transversely of its longitudinal axis in order to facilitate its removal from the mast.

The machine described can also be utilized for manufacturing pipes, hollow piles, or similar hollow structures. Hollow bodies can also be prepared according to this invention without stiffening devices.

I claim—

1. The process for manufacturing hollow tubular articles such as masts, pipes, piles, and the like from concrete in which the plastic mass of concrete is placed under a high pressure, in the shape of a strip, helically round a core subsequently removed, so that the strip is formed into a casing constituting one piece, that is to say, the complete body to be manufactured.

2. A process for manufacturing hollow tubular articles from armored concrete, in which the mass is helically placed under high pressure in the shape of a strip round a core subsequently removed, so that the strip forms a casing forming one piece and in which, simultaneously with the winding of the strip, are also applied strengthening-strips, for instance, iron bands or wire-works.

3. A process for manufacturing hollow tubular articles from concrete and armored concrete, in which the mass is wound under high pressure in the shape of a helical strip about a core subsequently removed, so that the strip forms a casing constituting one piece and the helical winding of the mass is effected by a tightly-stretched band moving in the longitudinal direction the band being wound about the core in a helical line, and onto which is discharged the concrete mass being fed onto the band in order to be conveyed by the band to the core and pressed around the latter.

4. A process for manufacturing hollow tubular articles from concrete and armored concrete, in which the mass is placed under high pressure, in the shape of a helical strip, round a core subsequently removed, so that the strip combines into a casing forming one piece, and the helical application of the mass is effected by means of a tightly-stretched band moving in its longitudinal direction, which is partly guided round the core and onto which the concrete is discharged from a charging device, in order to be conveyed by the band to the core and to be pressed on the latter by the tightness of the said band.

5. A process for manufacturing hollow tubular articles such as masts, pipes, piles, &c., from concrete and armored concrete, in which the plastic concrete mass is applied under high pressure, in the shape of a helical strip and in layers, about a core subsequently removed, so that the strip is formed into a casing, all in one piece, which constitutes the finished hollow body to be manufactured.

6. A process for manufacturing hollow tubular articles, such as masts, pipes, piles, &c., from armored concrete, in which the plastic concrete mass is applied under high pressure, in the shape of a helical strip and in layers, round a core subsequently removed, so that the strip combines into one casing, forming one piece and constituting the finished hollow body to be produced, applying a first layer containing a band-shaped strengthening device extending in the direction of the strip.

7. A process for manufacturing hollow tubular articles such as masts, pipes, piles, &c., from armored concrete, in which the plastic concrete mass is placed under high pressure, in the shape of a helical strip and in layers, round a core subsequently removed, so that the strip is combined into a casing forming one piece and constituting the finished hollow body to be produced, applying to the core a first layer containing a band-shaped strengthening device, extending in the direction of the strip, and applying between this first layer and the second layer a strengthening device extending in the longitudinal direction of the structure.

8. In a machine for the manufacture of hollow tubular articles such as masts, pipes, piles, &c., from concrete and armored concrete, a carriage with two pulleys over which is guided an endless band which is partly wound in a helical line round a core to effect the application of the concrete on the core, said carriage guiding the band along the stationary core.

9. In a machine for the manufacture of hollow tubular articles, such as masts, pipes, piles, &c., from concrete, and armored concrete, a carriage with two pulleys mounted on it, over which is guided an endless band which is partly wound in a helical line round a core, and effects the application of the concrete on the core, one of the two pulleys being movable in the direction of the band.

10. In a machine for the manufacture of hollow tubular articles such as masts, pipes, piles, &c., from concrete and armored concrete, a carriage with two pulleys mounted on the same over which is guided an endless band which is partly wound in a helical line round a core and effects the application of concrete on the core, one of the said two pulleys being movable in the direction of the band, and for its movement levers and weights being provided.

11. In a machine for the manufacture of hollow tubular articles, such as masts, pipes, piles, &c., from concrete and armored concrete, a carriage having the shape of a rotating disk with two pulleys mounted on it, over which is guided an endless band which is partly wound in a helical line round a core, and effects the application of the concrete on the core, and of which one pulley is movable in the direction of the band.

12. In a machine for the manufacture of hollow tubular articles such as masts, pipes, piles, &c., from concrete and armored concrete, a carriage with two pulleys mounted on it, over which is guided an endless band, partly wound in a helical line round a core, and effecting the application of the concrete on the core, and with pressure-rollers, one of which rests against a portion of the band wound round the core, and the other pressing the band against the pulley from which it is guided through the core.

13. In a machine of the class described, the combination of a core and means to distribute a plastic material progressively along the same, said means imparting rotation to the core.

14. In a machine of the class described, the combination of an endless carrier and a core, said carrier passing around the core at one portion of its travel and said core making an angle other than a right angle with the running-on and running-off portions of the carrier.

15. In a machine of the class described, the combination with a rotatable core, of an endless carrier passing around the core at one portion of its travel, the running-on and running-off portions thereof making an angle other than a right angle with the core, and means for depositing a plastic material onto the running-on portion of the carrier.

16. In a machine of the class described, the combination of a core, and means traveling along the core to distribute a plastic material thereon.

17. In a machine of the class described, the combination with a rotatable core, of a frame, a carrier mounted thereon traveling around the core and adapted to impart a relative movement to the frame and core.

18. In a machine of the class described, the combination with stationary supports and a core pivotally mounted therein, of a frame, an endless carrier passing around the core, rotary supports for the carrier, and means to operate the rotary supports whereby the carrier is moved along the core.

19. In a machine of the class described, the combination with a rotatable core, of an endless carrier passing around the core at one portion of its travel, means for automatically maintaining the carrier taut, and means for depositing a plastic material onto the carrier.

20. In a machine of the class described, the combination with a rotatable core, of an endless carrier passing around the core at one portion of its travel, the running-on and running-off portions thereof making an angle other than a right angle with the longitudinal axis of the core, a feed-roller and an idle roller supporting the carrier, and means to automatically move the idle roller in the direction of travel of the carrier.

21. In a machine of the class described, the combination with a rotatable core, of an endless carrier passing around the core at one portion of its travel, a feed-roller and an idle roller supporting the carrier, means to automatically maintain a portion of the carrier taut, and means to cause a portion thereof to sag.

22. In a machine of the class described, the combination with a rotatable core, of an endless carrier passing around the core at one portion of its travel, a feed-roller and an idle roller supporting the carrier, means to sag the carrier between the feed-roller and core, and means to hold the carrier taut between the core and idle roller.

23. In a machine of the class described, the combination with a rotatable core, of an endless carrier passing around the core at one portion of its travel, a feed-roller and an idle roller supporting the carrier, means to feed a plastic material onto the carrier between the feed-roller and core, a pressure device adapted to sag a portion of the carrier, and means to maintain the carrier taut between the pressure device and the idle roller.

24. In a machine of the class described, the combination with a rotatable core, a feed-roller, an idle roller, an endless band wound around the core and passing over the rollers, means to feed a plastic material onto the band between the core and feed-roller, a gravity-operated member engaging the band between the core and the idle roller and means to automatically move the latter away from the core for the purpose specified.

25. In a machine of the class described, the combination with a rotatable core, a frame, a feed-roller and an idle roller journaled in the frame, means to rotate the feed-roller and an endless band wound around the core passing over the rollers, of a support for the idle roller comprising slotted bearing-plates, a spindle carrying the idle roller mounted therein, weighted lever-arms pivoted in the bearing-plates, and means connecting the levers-arms and spindle.

26. In a machine of the class described, the combination with the main frame of a supplemental frame mounted in the main frame, slotted bearing-plates carried by the supplemental frame, an idle roller, a spindle carrying the latter mounted in the bearing-plates, a supporting-spindle journaled in the latter, weighted levers carried by the supporting-spindle, arms connected to the latter at an angle to the weighted levers, links connecting the arms with the roller-spindle, a feed-roller mounted in the main frame, and an endless carrier connecting the feed and idle rollers.

27. In a machine of the class described, the combination with the main frame, of a supplemental frame adjustably mounted in the main frame, slotted bearing-plates carried by the supplemental frame, an idle roller, a spindle therefor mounted in the slots of the supplemental frame, a supporting-spindle journaled in the bearing-plates, levers fixed on the latter spindle, a weight mounted on the free ends of the levers, arms fixed on the supporting-spindle at an angle to the levers, links connecting the arms with the spindle, a feed-roller mounted in the main frame, a rotatable core mounted between the feed and idle rollers, and an endless band wound around the core passing over the rollers.

28. In a machine of the class described, the combination with a framing, of a feed-roller and an idle roller supported thereby, a rotatable core mounted between the rollers, an endless band wound around the core passing over the rollers, upwardly-extending arms pivoted on the framing, a pressure-roll supported by said arms and means to press the roller against the endless band.

29. In a machine of the class described, the combination with the main frame, of a feed-roller journaled therein, a supplemental frame adjustably mounted in the main frame, an idle roller journaled in the supplemental frame, a rotatable core mounted between the rollers, an endless band wound around the core passing over the rollers, arms pivoted on the supplemental frame inclined toward the core, a rod connecting the free ends of the arms, a supporting member carried by the rod, a roller journaled in the supporting member, and means connected with the supporting member to press the roller against the endless band.

30. The combination with the endless carrier, the supporting-rollers, the rotatable core, a hopper mounted above the carrier in front of the core, a rotatable bottom in the hopper, of a ratchet-wheel connected with the bottom, a pawl in engagement with the ratchet-wheel, a link 29, means for adjustably connecting the link and pawl, a rotatable member, and a pitman connecting the latter and link.

In testimony that I claim the foregoing as my invention I have signed my name in presence of two subscribing witnesses.

HANS SIEGWART.

Witnesses:
 A. LIEBERKNECHT,
 E. BLUM.